US012686789B2

(12) United States Patent
Zhou et al.

(10) Patent No.: US 12,686,789 B2
(45) Date of Patent: Jul. 21, 2026

(54) WATERBORNE ONE COMPONENT NON-ISOCYANATE POLYURETHANE EPOXY HYBRID COATINGS

(71) Applicants: Qixin Zhou, Copley, OH (US); Cheng Zhang, Lakewood, CO (US); Zichen Ling, Akron, OH (US)

(72) Inventors: Qixin Zhou, Copley, OH (US); Cheng Zhang, Lakewood, CO (US); Zichen Ling, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 895 days.

(21) Appl. No.: 17/966,145

(22) Filed: Oct. 14, 2022

(65) Prior Publication Data

US 2023/0183523 A1 Jun. 15, 2023

Related U.S. Application Data

(60) Provisional application No. 63/289,328, filed on Dec. 14, 2021.

(51) Int. Cl.

*C09D 175/12* (2006.01)
*C08G 59/24* (2006.01)
*C08G 71/04* (2006.01)
*C09D 163/00* (2006.01)

(52) U.S. Cl.

CPC ......... *C09D 175/12* (2013.01); *C08G 59/245* (2013.01); *C08G 71/04* (2013.01); *C09D 163/00* (2013.01); *C08G 2150/00* (2013.01)

(58) Field of Classification Search

None

See application file for complete search history.

(56) References Cited

U.S. PATENT DOCUMENTS 5,508,340 A * 4/1996 Hart .................... C08G 18/4018 524/591
2017/0355806 A1* 12/2017 Zhou ......................... C08K 5/17
2019/0309137 A1* 10/2019 Lakrout ............... C08K 11/005
2021/0032495 A1 2/2021 Zhou et al.

FOREIGN PATENT DOCUMENTS

JP 2006009001 A * 1/2006

OTHER PUBLICATIONS

Non-isocyanate polyurethane/epoxy hybrid materials with different and controlled architectures prepared from a CO2-sourced monomer and epoxy via an environmentally friendly route (Year: 2017).*

* cited by examiner

*Primary Examiner* — Robert S Jones, Jr.
*Assistant Examiner* — Lily K Sloan
(74) *Attorney, Agent, or Firm* — RENNER KENNER GREIVE BOBAK TAYLOR & WEBER

(57) ABSTRACT

A method of preparing a composition for a one-package (1 K) waterborne non isocyanate polyurethane epoxy hybrid coating includes providing a cyclic carbonate; combining the cyclic carbonate with an internal emulsifier and a diamine to thereby obtain a non-isocyanate polyurethane (NIPU) prepolymer; subjecting the NIPU prepolymer to chain extension by combining the NIPU prepolymer with an epoxy resin, to thereby obtain a chain extended NIPU polymer; subjecting the chain extended NIPU polymer to neutralization by combining the chain extended NIPU polymer with a neutralizing agent, to thereby obtain a neutralized NIPU polymer; and dispersing the neutralized NIPU polymer in water to thereby provide a waterborne NIPU liquid dispersion.

17 Claims, 7 Drawing Sheets

3,3'-diamino-N-methyldipropylamine

Fatty acid diamine

Bisphenol A diglycidyl ether

Trimethylolpropane triglycidyl ether

WATERBORNE ONE COMPONENT NON-ISOCYANATE POLYURETHANE EPOXY HYBRID COATINGS

CROSS-REFERENCE TO RELATED APPLICATIONS

This application claims the benefit of U.S. Provisional Application No. 63/289,328, filed on Dec. 14, 2021, which is incorporated herein by reference.

STATEMENT REGARDING FEDERALLY SPONSORED RESEARCH OR DEVELOPMENT

This invention was made with government support under CBET 1943860 awarded by the U.S. National Science Foundation and under SU-84015801 awarded by the U.S. Environmental Protection Agency. The government has certain rights in the invention.

FIELD OF THE INVENTION

One or more embodiments of the present invention relate to a method of making a non-isocyanate polyurethane coating. One or more embodiments of the present invention relate to a method of making a waterborne, one component, non-isocyanate, polyurethane epoxy hybrid coating. One or more embodiments of the present invention relate to the coating.

BACKGROUND OF THE INVENTION

Polyurethanes are one of the most widely used polymers and have applications in many fields, including automotive, footwear, textile, packaging, adhesives, and coatings. A traditional synthesis method for polyurethane is the polyaddition reaction between a polyol and a difunctional or multifunctional isocyanate. However, the usage of isocyanate can bring environmental and health issues. Furthermore, phosgene is the main raw material to synthesize isocyanate, and phosgene can cause serious diseases.

Therefore, other efforts to produce polyurethane include isocyanate-free methods. Non-isocyanate polyurethane (NIPU) is the term for polyurethane produced from an isocyanate-free route. Some methods for developing NIPU include the transurethanization method and cyclic carbonate/amine reaction. The cyclic carbonate/amine reaction has a low reaction temperature and allows for various choices of raw materials from bio-based or petroleum-based sources.

Separate from NIPU methods, volatile organic components (VOC's) used in certain coatings also bring environmental concerns. Thus, waterborne polyurethane (WPU) has been investigated because of low VOC's and low flammability. Combining the features of NIPU and WPU, waterborne non-isocyanate polyurethane can be prepared by using non-ionic, cationic, or anionic dispersion agents.

Although the research on the synthesis of NIPU has made progress, the low reactivity of the cyclic carbonate/amine reaction still has impeded further development. Usually, a high synthesis temperature and a long reaction time are required to acquire high molecular weight NIPU polymers. To overcome this issue, other efforts include using high reactive cyclic carbonates. The 6-, 7-, and 8-membered cyclic carbonates have much higher reactivity than 5-membered cyclic carbonates (5CC), but the synthesis of these 6-, 7-, and 8-membered cyclic carbonates usually involves hazardous chemicals. So 5CC can be preferred relative to higher membered cyclic carbonates.

A two-package (2 K) waterborne NIPU hybridized with epoxy groups has been synthesized. A waterborne amine terminated NIPU prepolymer and a waterborne epoxy chain extender were the two packages to produce the waterborne NIPU.

However, one-package (1 K) coatings can be preferred relative to 2 K coatings. 1 K coatings can simplify the coating preparation process, eliminate the two-package ratio calculations, eliminate errors in the actual application, and facilitate material storage. Though, it remains challenging to generate stable 1 K coating systems.

There remains a need in the art for an improved method of making a polyurethane coating, especially an environmentally friendly method, and especially for a one-package (1 K) coating.

SUMMARY OF THE INVENTION

An embodiment of the present invention provides a method of preparing a composition for a one-package (1 K) waterborne non-isocyanate polyurethane epoxy hybrid coating, the method including steps of providing a cyclic carbonate; combining the cyclic carbonate with an internal emulsifier and a diamine to thereby obtain a non-isocyanate polyurethane (NIPU) prepolymer; subjecting the NIPU prepolymer to chain extension by combining the NIPU prepolymer with an epoxy resin, to thereby obtain a chain extended NIPU polymer; subjecting the chain extended NIPU polymer to neutralization by combining the chain extended NIPU polymer with a neutralizing agent, to thereby obtain a neutralized NIPU polymer; and dispersing the neutralized NIPU polymer in water to thereby provide a waterborne NIPU liquid dispersion.

Another embodiment of the present invention provides a method of coating a substrate, the method including steps of providing a one-package (1 K) composition including water and a waterborne non-isocyanate polyurethane epoxy hybrid polymer; applying the 1 K composition on the substrate; and allowing, following the step of applying, the water to evaporate to thereby form a coating including the waterborne non-isocyanate polyurethane epoxy hybrid polymer.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Figure 1:
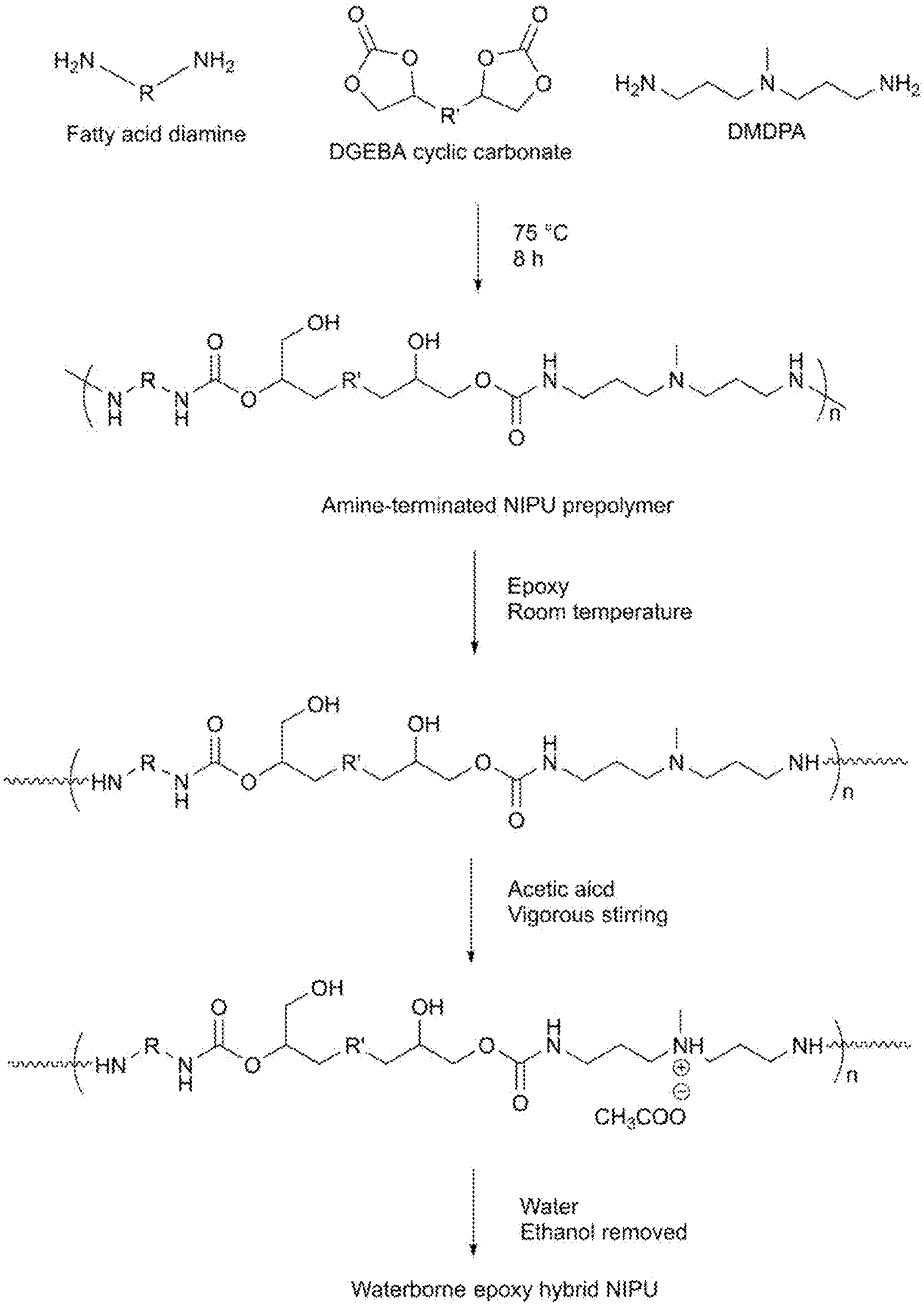
FIG. 1 is a schematic of a method of making a non-isocyanate polyurethane coating according to one or more embodiments of the present invention.

One or more embodiments of the present invention relate to a method of making a non-isocyanate polyurethane coating. One or more embodiments of the present invention relate to a method of making a waterborne, one component, non-isocyanate, polyurethane epoxy hybrid coating. One or more embodiments of the present invention relate to the coating.

One or more embodiments of a method of making a non-isocyanate polyurethane (NIPU) include preparing or providing a cyclic carbonate, which can be a bisphenol A diglycidyl ether (DGEBA) cyclic carbonate. The cyclic carbonate can then be utilized to synthesize a prepolymer, which may be referred to as an amine-terminated NIPU prepolymer. The synthesis of an amine-terminated NIPU prepolymer can include combining a DGEBA cyclic carbonate with an internal emulsifier and a fatty acid diamine. The internal emulsifier may be amine-based and may be 3,3'-diamino-N-methyldipropylamine (DMDPA). The fatty acid diamine may be a bio-based fatty acid amine. The cyclic carbonate, internal emulsifier, and fatty acid diamine can be dissolved in a suitable solvent, which may be ethanol.

Following synthesis of the prepolymer, the prepolymer can undergo chain extension. The chain extension can be by combination of the prepolymer with an epoxy resin. Exemplary epoxy resins include bisphenol A diglycidyl ether (DGEBA) and trimethylolpropane triglycidyl ether (TTE). Following a chain extension step, a neutralization step can be utilized. The neutralization generally includes combining the chain extended prepolymer with a neutralizing agent (e.g. an acid) to neutralize a chemical group within the chain extended prepolymer, which group may also be referred to as an incorporated internal dispersion monomer (IDM). For example, the neutralization can include neutralizing a tertiary amine group within the chain extended prepolymer. An exemplary neutralizing agent is acetic acid, and the neutralizing agent can be added at an equivalent amount or greater relative to the amount of the internal emulsifier (e.g. DMDPA). A next step of making a waterborne NIPU can include a dispersion step. A dispersion step can include dispersing into water the mixture obtained from the neutralization step, which mixture includes the neutralized NIPU polymer. After dispersion in water, the non-water solvent (e.g. ethanol) can be removed. The water content can also be adjusted to achieve a desired solids content.

Advantageously, the method is a relatively practical and easy method. The method is also a relatively green process. Moreover, the method does not utilize an isocyanate in order to produce the polyurethane product. As further discussed herein, the process also enables the production of tunable properties for the product waterborne polyurethane, which can be utilized for a coating application. The obtained product may therefore be referred to as a waterborne, one component, non-isocyanate, polyurethane epoxy hybrid coating. As a further advantage, the coating obtained from the method offers sufficient strength and thermal stability, among other desirable properties. Moreover, the coating is a one-package (1 K) coating.

Further details of embodiments of the method and the coating will now be provided.

As mentioned above, a first step can include preparing or providing a cyclic carbonate. In one or more embodiments, the cyclic carbonate can simply be provided from a previous preparation. In other embodiments, a method can include specific preparation of the cyclic carbonate.

Where the cyclic carbonate is prepared, this preparation can include combining a starting material with carbon dioxide and a catalyst. Exemplary starting materials include bisphenol A diglycidyl ether (DGEBA), ethylene glycol diglycidyl ether (EGDE), and glycol diglycidyl ether (GDE). Exemplary catalysts include tetrabutylammonium bromide (TBAB), quaternary ammonium salt modified amberlyst (D296), $Bu_4NBr$, and metal-organic frameworks (MOFs). The suitable molar ratio of the catalyst will depend on the selected starting material and selected catalyst, which will be known to the skilled person. After the starting material, carbon dioxide, and catalyst are combined, the mixture can be heated for the reaction. An exemplary temperature is about 130° C. In one or more embodiments, the temperature can be from room temperature (e.g. about 20° C.) to about 150° C., in other embodiments, from about 100° C. to about 150° C., and in other embodiments, from about 110° C. to about 140° C. An exemplary reaction time is about 96 hours. In one or more embodiments, the reaction time can be less than 96 hours, in other embodiments, less than 72 hours, and in other embodiments, less than 48 hours. The reaction can include stirring, such as magnetic stirring, and can occur at about atmospheric pressure. After the reaction is finished, the product can be cooled to room temperature and collected. Other details of preparing a cyclic carbonate will be generally known to the skilled person.

In one or more embodiments, the cyclic carbonate can be a 5-membered cyclic carbonates (5CC). In other embodiments, the cyclic carbonate can be a 6-, 7-, or 8-membered cyclic carbonate.

Where DGEBA is the starting material for the cyclic carbonate, the chemical structure for DGEBA cyclic carbonate is provided below.

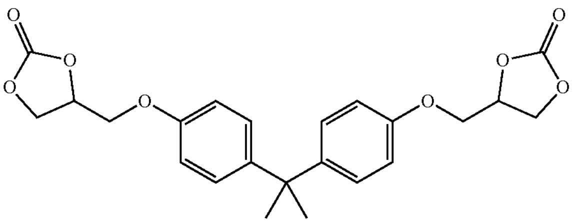

As shown below, other difunctional epoxy can also be used to produce the cyclic carbonate, where the R' group can be any divalent organic group.

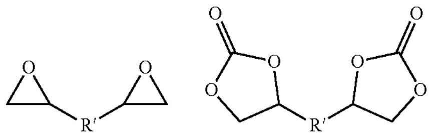

As mentioned above, once the cyclic carbonate obtained, the cyclic carbonate can then be utilized to synthesize a prepolymer. The cyclic carbonate can be combined with an internal emulsifier and a diamine. The internal emulsifier can be DMDPA. The diamine can be a fatty acid diamine.

In addition to 3,3'-diamino-N-methyldipropylamine (DMDPA), other exemplary internal emulsifiers include norspermidine, and other diamines with —NH— or —N— in the middle. The internal emulsifier can include two or more amine groups, and can include two end amine groups. The internal emulsifier may also be referred to as an amine-based internal emulsifier.

The chemical structure for DMDPA is provided below.

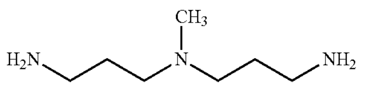

The diamine may be PRIAMINE 1075-LQ (GD) dimer fatty acid diamine (FDA). An exemplary chemical structure for FDA is provided below. Exemplary diamine can be biobased or petroleum based. Examples for the diamine include diethyl enetriamine, triethylenetetramine, tetraethylenepentamine, pentaethylenehexamine, propylenediamine, dipropylenetriamine, 2,4,4-trimethylhexamethylenediamine, 3,3'-diamino-N-methyldipropylamine, 1,4-bis-(3'-aminopropyl)-piperazine, N,N-bi s-(3-aminopropyl)-ethylenediamine, neopentanediamine, 2-methyl-1,5-pentanediamine, 1,3-diaminopentane, and hexamethylenediamine. The diamine can include two or more amine groups, and should include two end amine groups. Relative to the generic diamine shown below, R can be any divalent organic group.

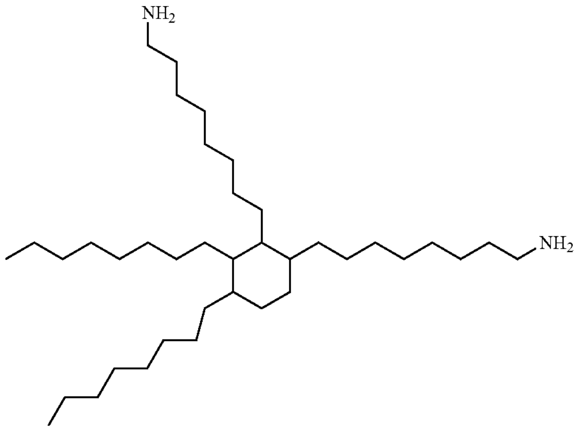

Fatty acid diamine

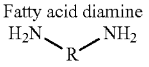

As mentioned above, the cyclic carbonate, internal emulsifier, and diamine can be dissolved in a suitable solvent, which may be ethanol. Other suitable solvents include methanol, methyl ethyl ketone (MEK), and other common water soluble solvents. After the cyclic carbonate, internal emulsifier, and fatty acid diamine are dissolved in the solvent, the mixture can be heated for the reaction. An exemplary temperature is about 75° C. In one or more embodiments, the temperature can be from room temperature (e.g. about 20° C.) to about 100° C., in other embodiments, from about 20° C. to about 90° C., and in other embodiments, from about 60° C. to about 80° C. An exemplary reaction time is about 8 hours. In one or more embodiments, the reaction time can be from about 6 hours to about 24 hours, and in other embodiments, from about 6 hours to about 12 hours. The reaction can include stirring, such as magnetic stirring. The reaction can be under $N_2$ purge and can occur at a suitable pressure, including about atmospheric pressure. After the reaction is finished, the product can be cooled to room temperature and collected. The product is an NIPU prepolymer, which may be referred to as an amine-terminated NIPU prepolymer.

The step of synthesizing a prepolymer may be analyzed for completion relative to the cyclic carbonate groups. FTIR and NMR can be used to detect the cyclic carbonate groups. If the cyclic carbonate groups are not present, or substantially not present, then the reaction can be considered complete.

An exemplary chemical structure for the amine-terminated NIPU prepolymer is provided below, where the R group and the R' group are similar to the above disclosure, and where n is an integer greater than 1, and can be any suitable integer, including up to 100.

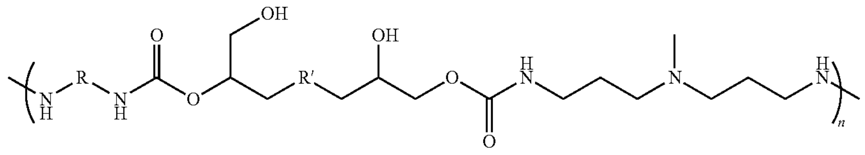

After the amine-terminated NIPU prepolymer is obtained, the amine-terminated NIPU prepolymer can be subjected to a chain extension step. This generally includes combining an epoxy resin with the amine-terminated NIPU prepolymer. Alternatives to epoxy resin include arylate and silicon resin, though the preparation procedure and conditions should be considered accordingly. In one or more embodiments, the epoxy resin can be added to the same vessel where the amine-terminated NIPU prepolymer is prepared. An exemplary temperature for the chain extension step is room temperature (e.g. about 20° C.). The chain extension step can include stirring, such as magnetic stirring. An exemplary time for the chain extension step is about 1 hour. In one or more embodiments, the reaction time can be from about 30 minutes to about 4 hours, and in other embodiments, from about 30 minutes to about 2 hours. In addition to bisphenol A diglycidyl ether (DGEBA) and trimethylolpropane triglycidyl ether (TTE), other exemplary epoxy resins include 4,4'-Methylenebis (N,N-diglycidylaniline) (MBDA), and other epoxy resins including functionality of 2-4.

The chain extension step generally serves to incorporate groups with relatively high reactivity (i.e. epoxy groups) into the amine-terminated NIPU prepolymer. This thereby generally serves to increase the reactivity of the NIPU prepolymer. The step of chain extension may be considered complete when the epoxy groups are not present, or substantially not present, which will occur relatively quickly.

An exemplary chemical structure for the chain extended NIPU polymer is provided below, where the R group and the R' group are similar to the above disclosure.

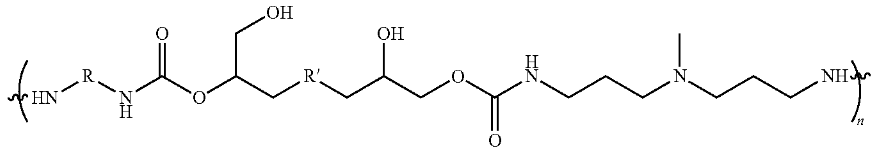

As mentioned above, the mixture including the chain extended NIPU polymer, may undergo a neutralization step. After a desired time for the chain extension step, the chain extended NIPU polymer can be combined with a neutralizing agent to achieve a neutralized NIPU polymer. In one or more embodiments, the neutralizing agent can be added to the same vessel where the chain-extended NIPU polymer is prepared. The neutralizing agent generally serves to neutralize a chemical group within the chain extended prepolymer, which group may also be referred to as an incorporated internal dispersion monomer (IDM). The IDM can be an amine-based IDM. For example, the neutralization can include neutralizing a tertiary amine group within the chain extended prepolymer. An exemplary neutralizing agent is acetic acid. The neutralizing agent can be added at an equivalent amount or greater relative to the amount of the internal emulsifier (e.g. DMDPA). This is because the chemical group to be neutralized (e.g. tertiary amine group) is from the internal emulsifier (e.g. DMDPA). In order to neutralize this chemical group, the neutralizing agent should be the same molar amount or greater to the amount of the internal emulsifier.

In addition to acetic acid, other exemplary neutralizing agents include other commonly used acids. As mentioned above, the neutralizing agent can be added at an equivalent amount or greater relative to the amount of the internal emulsifier (e.g. DMDPA). The neutralizing agent is believed to become part of the polymer. An exemplary temperature for the neutralization step is room temperature (e.g. about 20° C.). An exemplary time for the neutralization step is about 1 hour. In one or more embodiments, the neutralization step can be from about 5 minutes to about 4 hours, and in other embodiments, from about 30 minutes to about 1 hour. The neutralization step can include stirring, such as magnetic stirring.

An exemplary chemical structure for the neutralized NIPU polymer is provided below, where the R group, the R' group, and n are similar to the above disclosure.

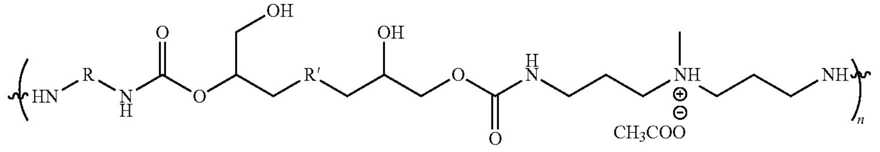

To obtain the waterborne epoxy hybrid NIPU product, the next step of making a waterborne NIPU can include a dispersion step where the neutralized NIPU polymer is dispersed in water. In one or more embodiments, the dispersion step can occur in the same vessel where the neutralized NIPU polymer is prepared. The dispersion step can include stirring, such as magnetic stirring. In connection with the dispersion step, a solvent removal step can be utilized to remove the previously utilized solvent (e.g. ethanol). Solvent removal can occur via a rotary evaporator. The dispersion step and solvent removal thereby produce the waterborne, one component, non-isocyanate, polyurethane epoxy hybrid material, which may be referred to as a 1 K waterborne epoxy hybrid NIPU. An exemplary stirring time is about 1 hour. The dispersion step should proceed until a stable composition forms.

The dispersion step and solvent removal can achieve a desired solid content for the waterborne NIPU polymer, which may also be referred to as the waterborne NIPU liquid dispersion. An exemplary solid content for the waterborne NIPU polymer is about 20 wt. %. In other embodiments, the solid content for the waterborne NIPU polymer is from about 10 wt. % to about 40 wt. %, in other embodiments, from about 10 wt. % to about 20 wt. %, and in other embodiments, from about 15 wt. % to about 25 wt. %. The solid content of the waterborne NIPU polymer can be selected and adjusted based upon amount of water added.

Following obtaining the waterborne NIPU liquid dispersion, the waterborne NIPU liquid dispersion can be cast onto a substrate to form a wet film, and then the film may be cured to form a coating. The wet film should be dried to evaporate the water, in order to obtain a coating film of the NIPU polymer, which may be referred to as a waterborne NIPU coating, a waterborne NIPU film, or a waterborne NIPU coating film. A drying step can be performed at room temperature (e.g. about 20° C.). A drying step at room temperature may be performed for about 12 hours. A drying step may include both a step of drying at room temperature (e.g. about 12 hours), which may achieve a tack-free film, and then a step of drying in an oven. Where an oven is utilized, the tack-free films may be baked in an oven at a temperature of about 120° C., and in other embodiments up to about 140° C. Drying in an oven may be performed for about 2 hours, and in other embodiments from about 1 hour to about 3 hours, which as mentioned above, may follow a room temperature drying step. Following sufficient drying, a mechanically strong dry film is obtained.

Generally, the waterborne NIPU liquid dispersion will be provided to a desired end user for the coating. That is, the end user will generally perform the drying step. Thus, one or more embodiments of the method disclosed herein can include steps providing the waterborne NIPU liquid dispersion to the end user and having the end user perform the drying step.

In one or more embodiments, the waterborne NIPU liquid dispersion may consist essentially of the NIPU polymer and water. In one or more embodiments, the waterborne NIPU liquid dispersion may consist of the NIPU polymer and water.

Prior to a drying step, the waterborne NIPU material may be applied on a substrate as a wet NIPU coating at a wet film thickness of about 120 μm. In one or more embodiments, the wet film thickness can be from about 25 μm to about 500 μm, in other embodiments, from about 50 μm to about 250 μm, and in other embodiments, from about 100 μm to about 150 μm.

After a drying step, the waterborne NIPU coating may be on the substrate at a dry film thickness of about 45 μm. In one or more embodiments, the dry film thickness can be from about 5 μm to about 300 μm, in other embodiments, from about 25 μm to about 200 μm, and in other embodiments, from about 50 μm to about 100 μm.

As mentioned above, the waterborne NIPU coating is a one-package (1 K) coating. The term one-package coating is generally known to the skilled person. An exemplary definition of the term one-package coating is only one container for the coating. In other words, the 1 K coating may refer to a coating where all of the components of the coating can be stable in the container without curing for a desirable time until it is applied.

Exemplary substrates which may be coated with the waterborne NIPU coating include metal, such as steel, aluminum, and alloys; wood; and some plastics.

Though details of the various method steps, and components utilized therein, are disclosed elsewhere herein, additional details are provided here.

The waterborne NIPU polymer may be characterized by the molar ratio of the various components. In one or more embodiments, the waterborne NIPU material may have a mole ratio of the cyclic carbonate groups:epoxy groups: amine groups of about 1:about 1:about 2. In one or more embodiments, the waterborne NIPU material may have a mole ratio of the cyclic carbonate groups:epoxy groups: amine groups of from about 0.1 to about 1.9:about 1.9 to about 0.1:about 2. For example, if the cyclic carbonate group is a mole ratio of 0.1, then the epoxy groups should be 1.9. That is, the summation of the cyclic carbonate groups and the epoxy groups should equal to the amine groups, which can be about 2 in one or more embodiments.

A method of making the waterborne NIPU polymer may be characterized by the weight percent of the internal emulsifier (e.g. DMDPA) utilized. In one or more embodiments, the internal emulsifier may be utilized in an amount of about 5 wt. %, in other embodiments, about 10 wt. %, relative to the total weight of the NIPU polymer. In one or more embodiments, the internal emulsifier may be utilized in an amount of from about 5 wt. % to about 20 wt. %, in other embodiments, from about 5 wt. % to about 10 wt. %.

The NIPU polymer may be characterized by the amount of hard segment content and the amount of soft segment content. As generally known to the skilled person, hard segment content is relatively glassy or semi crystalline material, and soft segment content is relatively elastomeric material. In the present disclosure, the fatty acid amine (e.g. dimer fatty acid diamine (FDA)) generally provides the soft domain, while the internal emulsifier (e.g. 3,3'-diamino-N-methyldipropylamine (DMDPA)), the cyclic carbonate, and the epoxy groups generally provide the hard segments. Therefore, the hard segment content can generally be calculated by dividing the sum of the internal emulsifier, the cyclic carbonate, and the epoxy resin by the total weight of the NIPU polymer. The NIPU polymer can have any suitable hard segment content from 0% to 100% depending on the performance requirements.

The waterborne NIPU polymer may be characterized by glass transition temperature ($T_g$). The $T_g$ of any particular waterborne NIPU polymer may be tuned generally based on different weights of soft segments and hard segments in the NIPU polymers. In general, soft segments provide a lower $T_g$, whereas hard segments result in higher $T_g$ due to the immobility thereof. In one or more embodiments, the waterborne NIPU polymer will have only one $T_g$. In one or more embodiments, the NIPU polymer has a glass transition temperature ($T_g$) of from about −50° C. to about 100° C. The glass transition temperature (Tg) of the waterborne NIPU polymers can be determined by differential scanning calorimetry (DSC, TA Instruments Q200), with a sample weight of about 5 mg.

The waterborne NIPU polymer may be characterized by thermal stability. Thermal stability may be determined by the temperatures of certain weight loss upon heating, such as 10% weight loss ($T_{10}$) and 20% weight loss ($T_{20}$). In one or more embodiments, the NIPU polymer has a thermal stability $T_{10}$ of from about 300° C. to about 400° C. In one or more embodiments, the NIPU polymer has a thermal stability $T_{20}$ of from about 350° C. to about 400° C. The thermal stability of the waterborne NIPU polymer can be determined by thermogravimetric analysis (TGA, TA Instruments Q500), with a sample weight of about 10 mg.

EXAMPLES

Figure 2:
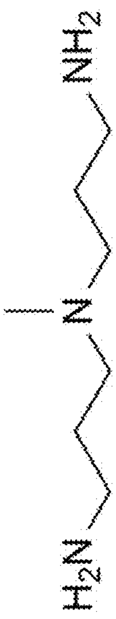
FIG. 2 is a schematic of certain chemical compounds utilized in a method of making a non-isocyanate polyurethane coating according to one or more embodiments of the present invention.
Figure 2:
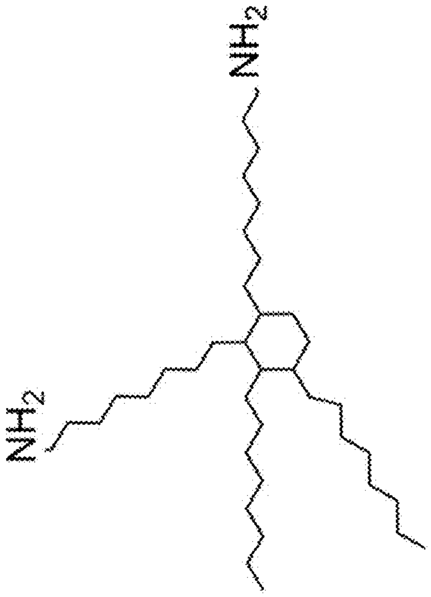
Figure 2:
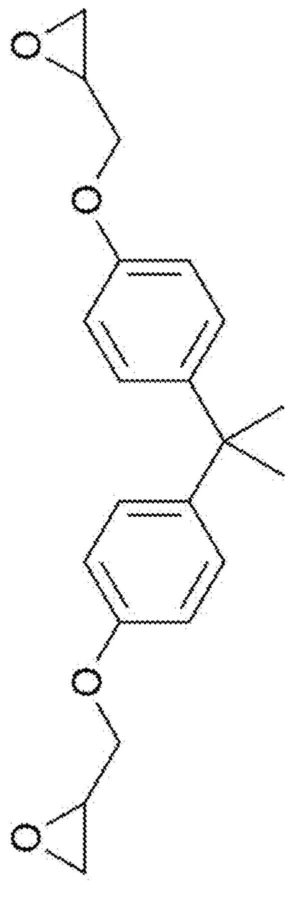
Figure 2:
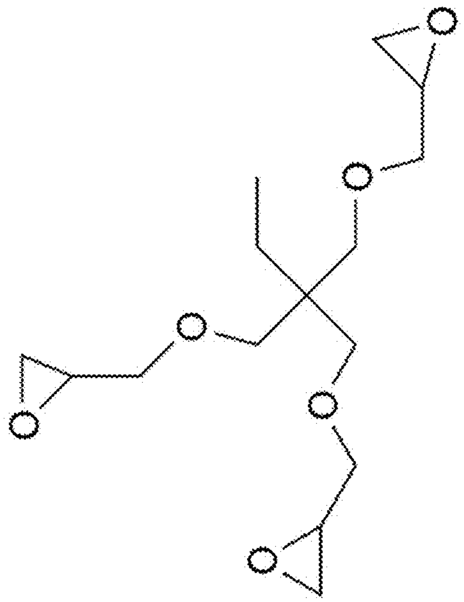

Materials 3,3'-diamino-N-methyldipropylamine (DMDPA, 96%, 145.25 g $mol^{-1}$), tetrabutylammonium bromide (TBAB, ≥98%), bisphenol A diglycidyl ether (DGEBA, 340.41 g $mol^{-1}$), trimethylolpropane triglycidyl ether (TTE, technical grade, 302.36 g $mol^{-1}$), acetic acid (≥99.7%), ethanol (200 proof), and PRIAMINE 1075-LQ (GD) dimer fatty acid diamine (FDA) were obtained from commercially available sources. The chemical structures of certain raw materials are shown in FIG. 2.

Synthesis of DGEBA Cyclic Carbonate

Figure 3:
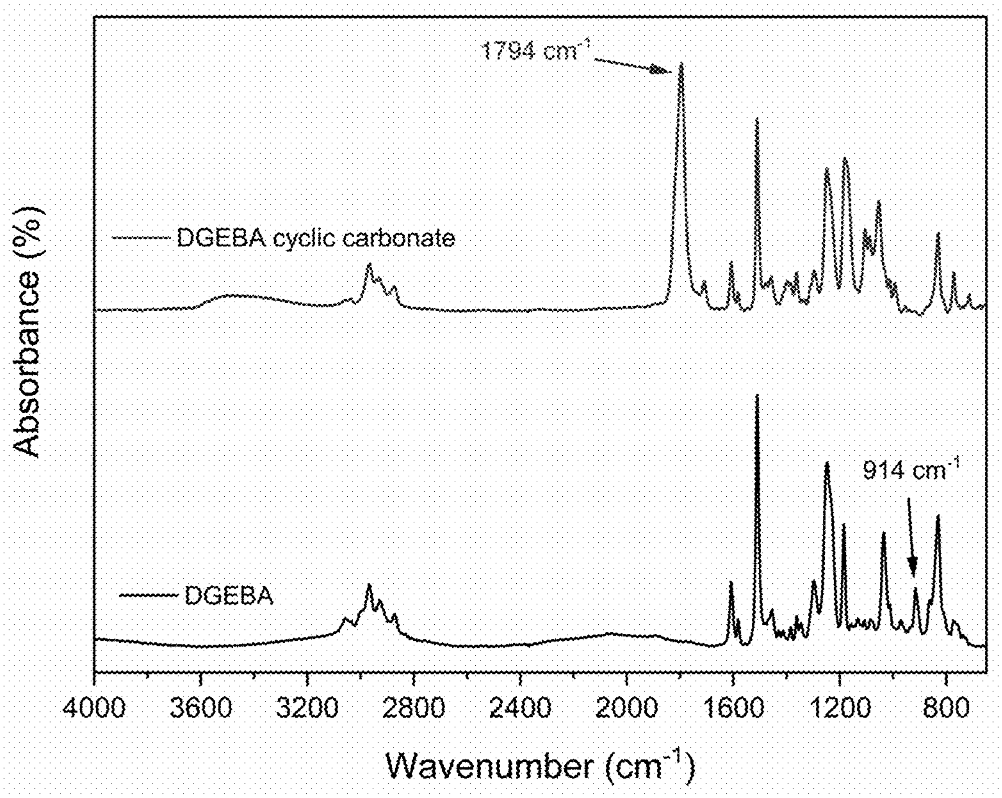
FIG. 3 is a graph showing Fourier-transform infrared spectroscopy (FTIR) spectra of bisphenol A diglycidyl ether (DGEBA) and DGEBA-cyclic carbonate.
Figure 4:
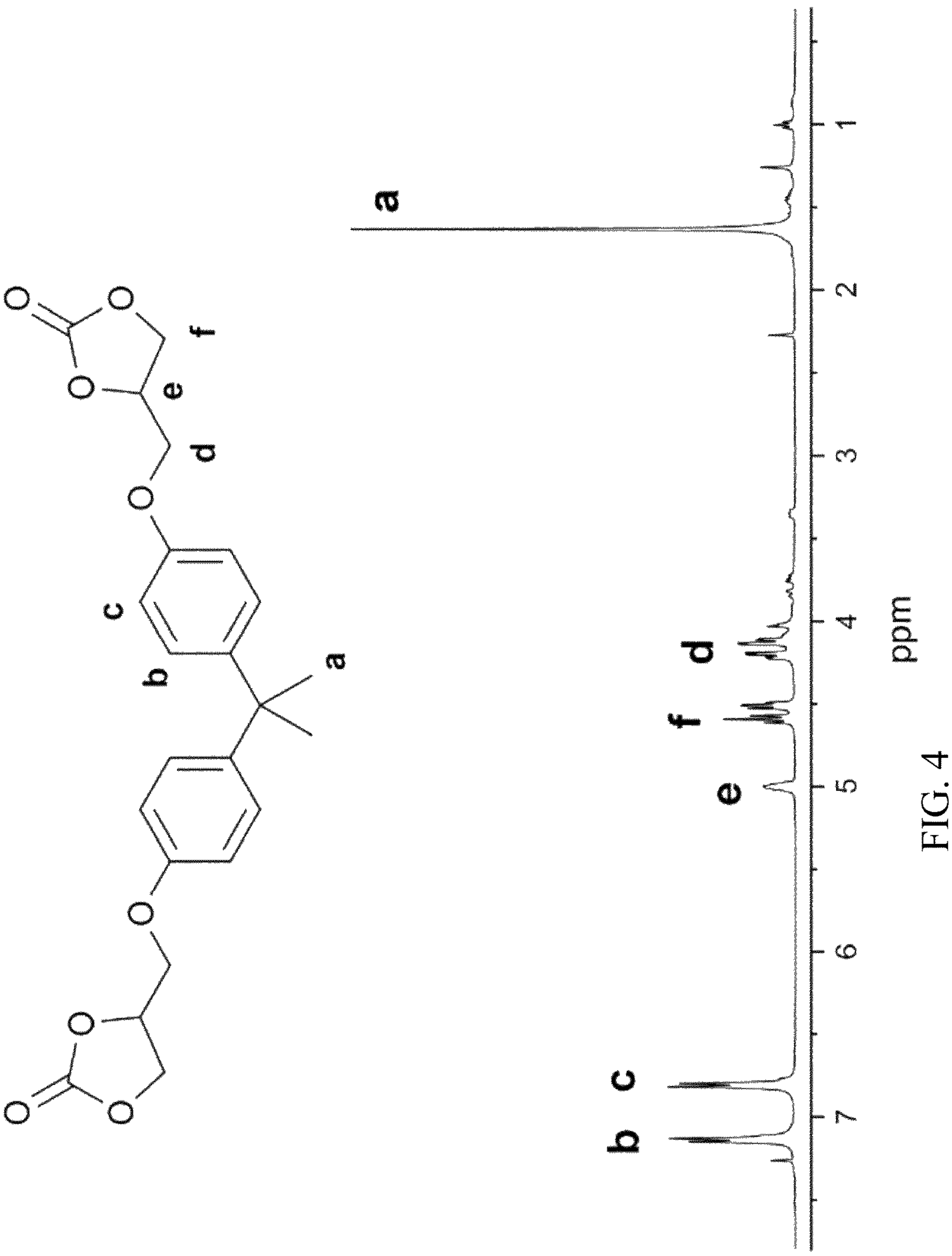
FIG. 4 is a graph showing $^1H$ nuclear magnetic resonance (NMR) spectra of the DGEBA-cyclic carbonate.

DGEBA cyclic carbonate was synthesized from the DGEBA by adding carbon dioxide and catalyzed by TBAB according to a known technique. 150.0 g DGEBA and 5.0 g TBAB were added into a 500 mL three-neck round-bottom reaction flask equipped with a $CO_2$ inlet. Then the temperature was increased to 130° C. and reacted for 96 h with magnetic stirring under atmospheric pressure. After the reaction was finished and cooled to room temperature, the final product was collected. The DGEBA cyclic carbonate was a transparent yellow brittle solid. The chemical structure of the DGEBA cyclic carbonate was characterized by FTIR (FIG. 3), $^1$H NMR (FIG. 4), and $^{13}$C NMR.

Synthesis of Waterborne Epoxy Hybrid NIPU

The synthesis of a waterborne epoxy hybrid NIPU included four steps as shown in FIG. 1—synthesis of amine-terminated NIPU prepolymer, chain extension by epoxy resins, neutralization, and dispersion. Firstly, the DGEBA cyclic carbonate, DMDPA, and fatty acid diamine were dissolved in ethanol and well mixed by magnetic stirring under $N_2$ purge. Then, the mixture was heated to 75° C. for 8 h to synthesize the amine-terminated NIPU. Secondly, after the sample was cooled to room temperature, an epoxy resin was added into the flask under magnetically stirred for 1 h. Thirdly, an equivalent amount of acetic acid based on the amount of DMDPA was added into the mixture to neutralize the product under stirring for 1 h. Finally, the NIPU polymer was dispersed in water under vigorous stirring, followed by solvent removal by a rotary evaporator. The solid content of the waterborne NIPU was controlled to around 20 wt. %.

Figure 5:
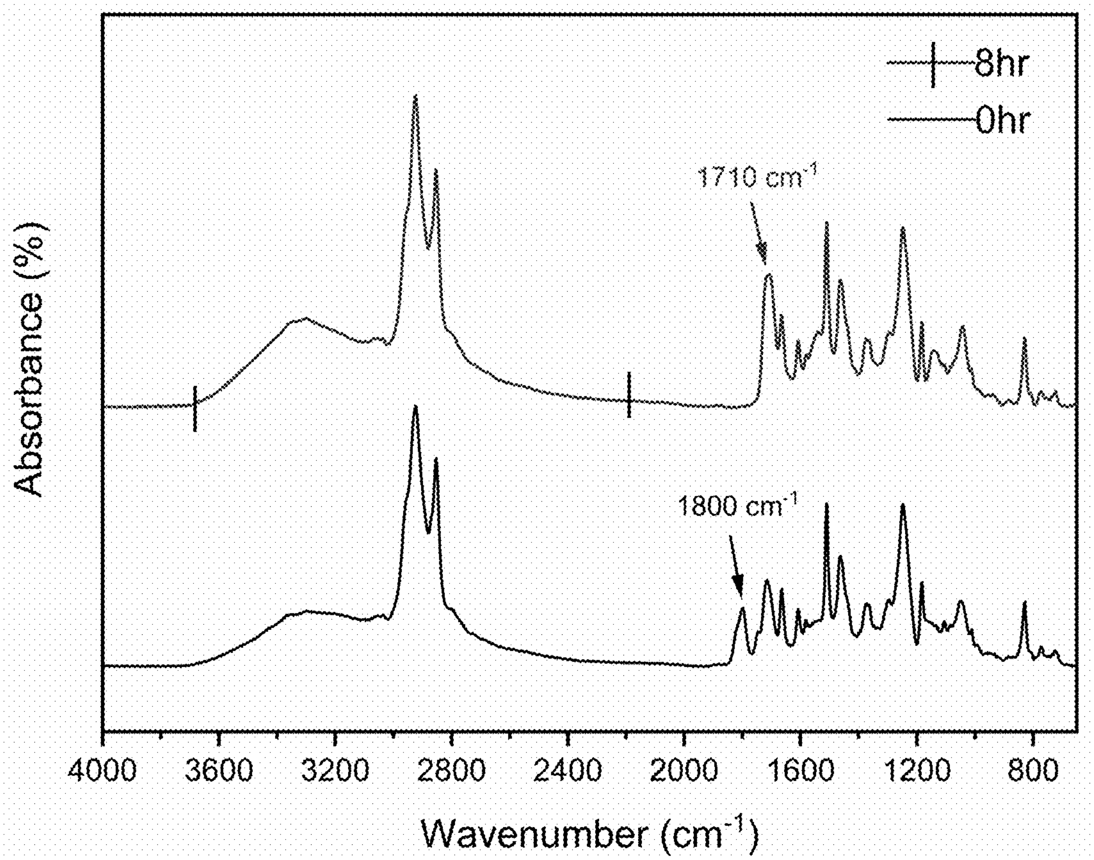
FIG. 5 is a graph showing FTIR spectra of an amine-terminated non-isocyanate polyurethane (NIPU) prepolymer at 0 hours and 8 hours reaction times.

FTIR was utilized to monitor the changes of chemical groups during the synthesis of amine-terminated NIPU prepolymer. The FTIR of DGEBA-5 was chosen as an example to represent other cyclic carbonates during the synthesis. As shown in FIG. 5, after 8 h reaction, the absorption peak of C═O stretching at 1800 $cm^{-1}$ disappeared which suggested that all the cyclic carbonates completely reacted with amines.

Figure 6:
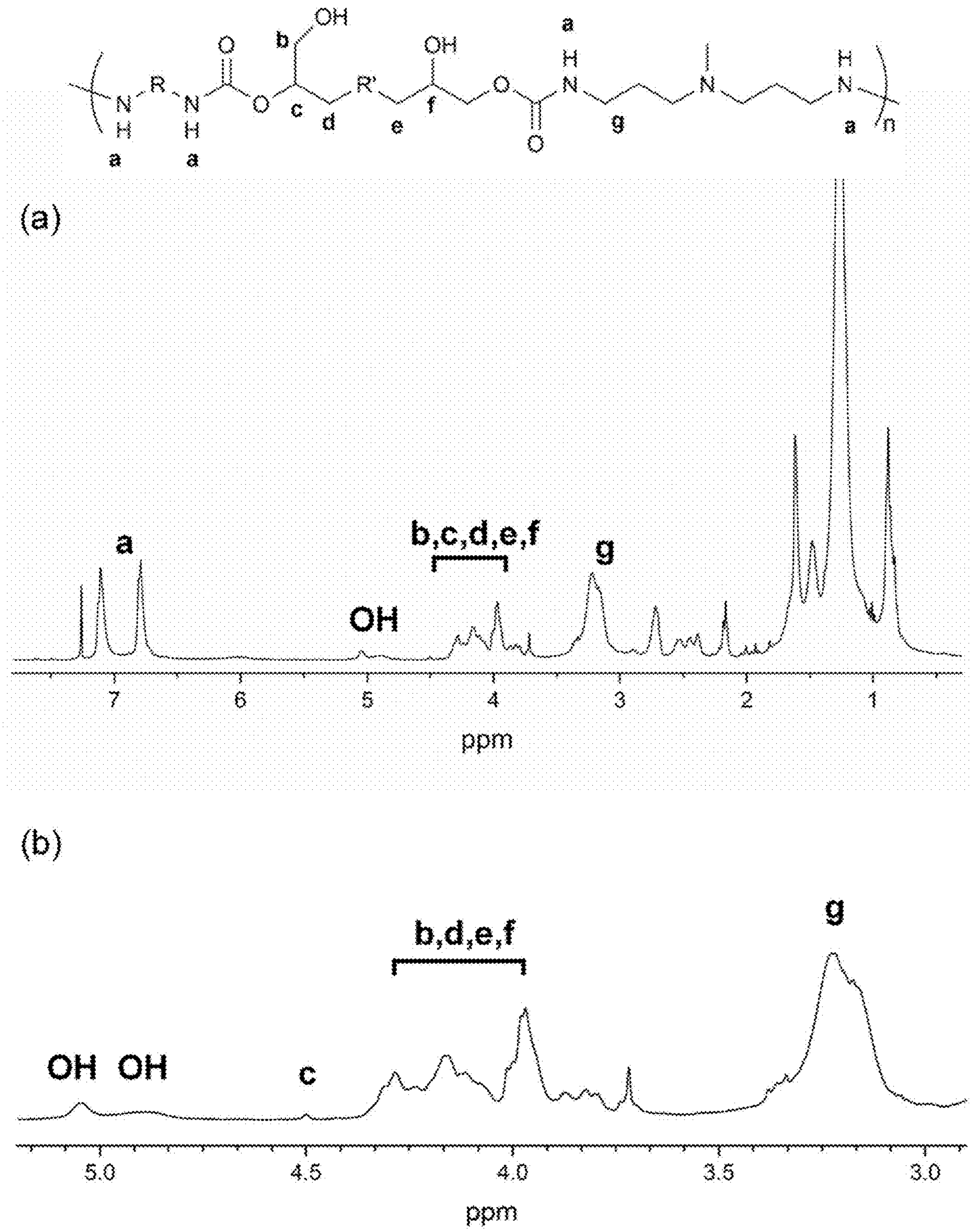
FIG. 6 is a graph showing $^1H$ NMR spectra of the amine-terminated NIPU prepolymer.

In addition, the chemical structure of the NIPU prepolymer was also confirmed by $^{1}H$ NMR and as illustrated in FIG. 6, where the (a) portion represents the full range and the (b) portion represents the range of 5.2 ppm to 2.9 ppm.

Figure 7:
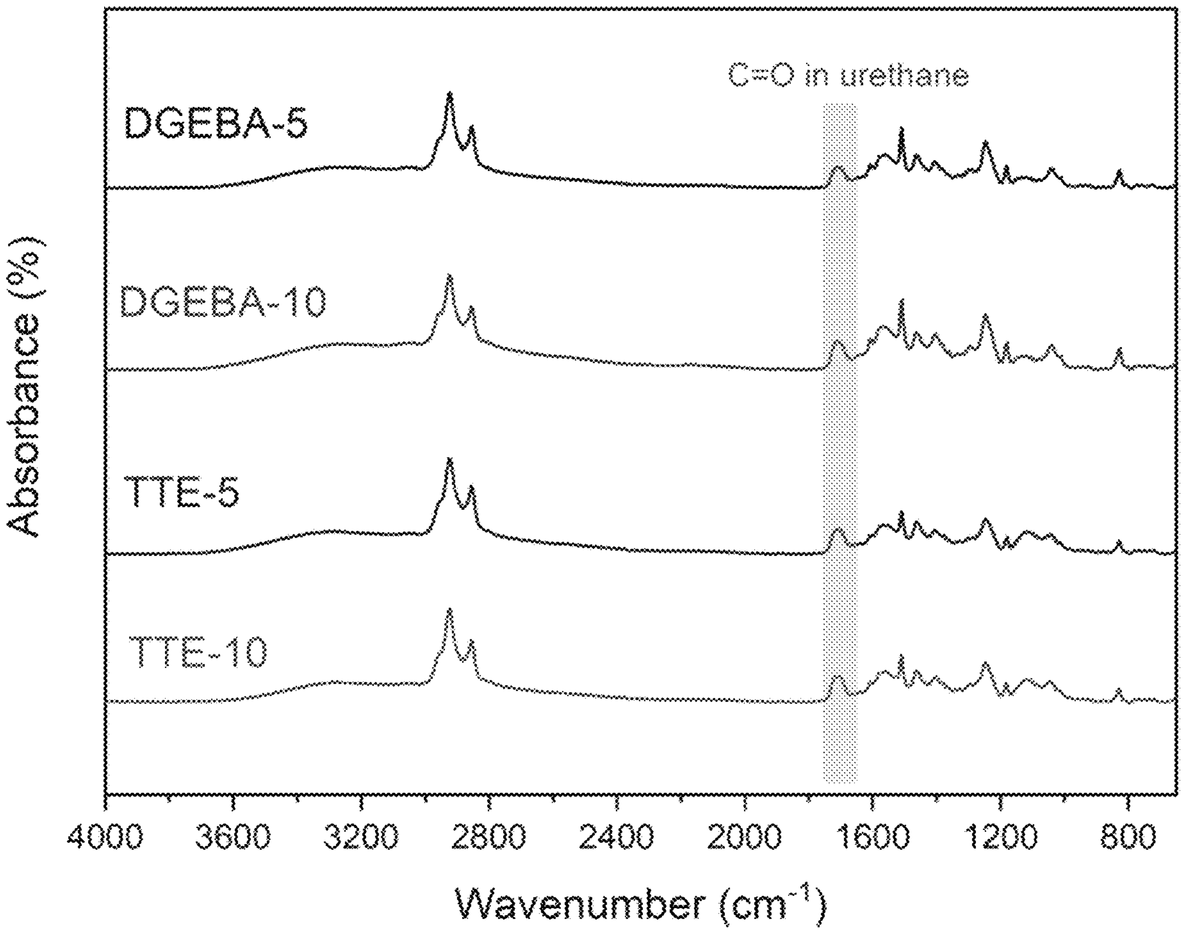
FIG. 7 is a graph showing FTIR spectra of various one package (1 K) waterborne epoxy hybrid NIPU films, utilizing different compositional details, according to one or more embodiments of the present invention.

After the curing of waterborne NIPU epoxy hybrid coatings, the functional groups of the coating films were characterized by the infrared spectrum. As illustrated in FIG. 7, the appearance of the C═O stretching further verified the existence of the urethane group in the cured coating films.

Two different epoxy resins were chosen in the third synthesis step to generate different waterborne epoxy hybrid NIPUs. These epoxy resins were DGEBA and TTE. The formulations of different waterborne NIPUs are listed in Table 1. The mole ratio of the cyclic carbonate group/epoxy group/amine group was 1:1:2.

TABLE 1

Composition details of various 1K waterborne epoxy hybrid NIPU (wt. %)

| | DMDPA | Cyclic carbonate | FDA | DGEBA | TTE | Hard segment[a] |
|---|---|---|---|---|---|---|
| DGEBA-5 | 5 | 27 | 47 | 21 | — | 53 |
| DGEBA-10 | 10 | 30 | 37 | 23 | — | 63 |
| TTE-5 | 5 | 29 | 52 | — | 14 | 48 |
| TTE-10 | 10 | 33 | 41 | — | 16 | 59 |

[a]The hard segment content = weight of (DMDPA + cyclic carbonate + DGEBA/TTE)/total weight.

The samples are named in Table 1 by the type of epoxy resin used and the weight percent of DMDPA used. For instance, DGEBA-5 is waterborne NIPU hybridized with DGEBA epoxy containing 5 wt. % DMDPA. The hard segment content can be calculated by dividing the weight of DMDPA, DGEBA cyclic carbonate, and epoxy resins by the total weight.

Preparation of 1 K Waterborne NIPU Epoxy Hybrid Coatings

After the synthesis of the different waterborne NIPUs, the polymers were applied on steel substrates (Q-Lab Corporation, QD-36) by a drawdown bar with a wet film thickness of 120 um. The samples were dried at room temperature for 12 h of water evaporation to form mechanically strong dry films. To achieve better film formation, the tack-free films were baked in an oven at 120° C. for 2 h. Finally, the testable coatings were obtained with a dry film thickness of around 45 μm after placing in the air at room temperature for 7 days.

Characterization Methods

FTIR spectra were obtained by a Nicolet iS10 FT-IR Spectrometer with transmission mode at room temperature. The data was collected from 64 scans with a resolution of 4 $cm^{-1}$. $^{1}H$ and $^{13}C$ NMR spectra were performed from a Varian INOVA 300 instrument at room temperature using $CDCl_3$ as the solvent.

The glass transition temperature ($T_g$) of waterborne NIPU films was determined by the differential scanning calorimetry (DSC, TA Instruments Q200). The weight of samples was around 5 mg. The temperature was increased from −40 to 140° C. under a nitrogen atmosphere (40 ml $min^{-1}$) and the rate was 10° C. $min^{-1}$. Only one Tg of each coating was observed that indicating the coating was homogeneous without micro-phase separation which means the soft segments and the hard segments of the waterborne NIPU films were well mixed.

The thermal stability of waterborne NIPU coatings was characterized by the thermogravimetric analysis (TGA, TA Instruments Q500). The weight of samples was around 10 mg. The temperature of the sample was raised to 600° C. at a steady rate of 10° C. $min^{-1}$ under nitrogen purge (10 mL $min^{-1}$) and then kept at 600° C. for 10 min.

The mechanical properties of waterborne NIPU coatings were measured by an Instron 5567 testing machine (Instron Corp) at room temperature. The self-standing films were peeled off from the substrates and cut into the desired dimensions for mechanical testing. The dimension of samples was around 30 mm in length and 10 mm in width. The moving speed of the test frame was 5 mm $min^{-1}$. The average data was obtained by five duplicable tests for each sample.

The waterborne NIPU coating samples (coatings on the steel substrates) were also evaluated for their general coating properties. The general coating properties including pendulum hardness, pencil hardness, solvent resistance, impact resistance, crosshatch adhesion, and pull off adhesion were investigated based on the standards of ASTM D4366, ASTM D3363, ASTM D4752, ISO 6272-2, ASTM D3359, and ASTM D4541, respectively.

The $T_g$ values, thermal stability values, and mechanical properties of various 1 K waterborne NIPU epoxy hybrid coating films are listed in Table 2 below.

TABLE 2

Thermal and mechanical properties of various 1K waterborne NIPU epoxy hybrid coating films

| | DSC (° C.) | TGA (° C.) | | Tensile test[a] | | |
|---|---|---|---|---|---|---|
| | $T_g$ | $T_{10}$ | $T_{20}$ | ε (%) | σ (MPa) | E (MPa) |
| DGEBA-5 | 14 | 338 | 374 | 79.5 ± 6.4 | 1.7 ± 0.2 | 33.2 ± 6.6 |
| DGEBA-10 | 19 | 312 | 363 | 56.1 ± 8.0 | 3.5 ± 0.4 | 102.5 ± 20.4 |
| TTE-5 | 7 | 337 | 371 | 167.3 ± 31.3 | 3.2 ± 0.4 | 23.9 ± 2.2 |
| TTE-10 | 18 | 302 | 352 | 85.8 ± 22.5 | 4.4 ± 0.4 | 102.9 ± 21.4 |

[a]ε is elongation-at-break; σ is tensile strength, and E is Young's modulus.

Certain coating properties of various 1 K waterborne NIPU epoxy hybrid coating films are listed in Table 3 below.

TABLE 3

Coating properties of various 1K waterborne NIPU epoxy hybrid coating films

| | Pendulum hardness (s) | Pencil hardness | Solvent resistance[a] |
|---|---|---|---|
| DGEBA-5 | 20 | 4B | 46 |
| DGEBA-10 | 34 | HB | 96 |
| TTE-5 | 14 | 5B | 62 |
| TTE-10 | 25 | 4B | 100+ |

| | Impact resistance (kg · cm) | Crosshatch adhesion | Pull-off adhesion (MPa)[b] |
|---|---|---|---|
| DGEBA-5 | 100+ | 4B | 1.8 ± 0.2 |
| DGEBA-10 | 100+ | 5B | 1.8 ± 0.1 |
| TTE-5 | 100+ | 4B | 1.8 ± 0.1 |
| TTE-10 | 100+ | 4B | 1.9 ± 0.2 |

[a]The unit of solvent resistance is the number of MEK double rubs.
[b]Failure type is the mix of cohesive failure and adhesive failure.

In light of the foregoing, it should be appreciated the present invention advances the art by providing an improved method of making a waterborne, one component, non-isocyanate, polyurethane epoxy hybrid coating. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of preparing a composition for a one-package (1 K) waterborne non-isocyanate polyurethane epoxy hybrid coating, the method comprising steps of combining a cyclic carbonate with one or more of 3,3'-diamino-N-methyldipropylamine (DMDPA) and norspermidine as an internal emulsifier and a diamine to thereby obtain a non-isocyanate polyurethane (NIPU) prepolymer, where the internal emulsifier also provides hard segments to an eventual neutralized NIPU polymer;

subjecting the NIPU prepolymer to chain extension by combining the NIPU prepolymer with an epoxy resin, to thereby obtain a chain extended NIPU polymer;

subjecting the chain extended NIPU polymer to neutralization by combining the chain extended NIPU polymer with a neutralizing agent, to thereby obtain the neutralized NIPU polymer; and dispersing the neutralized NIPU polymer in water to thereby provide a waterborne NIPU liquid dispersion as a one-package (1 K) composition.

2. The method of claim 1, wherein the step of providing the cyclic carbonate includes synthesizing the cyclic carbonate by combining a starting material with carbon dioxide and a catalyst, wherein the catalyst is selected from tetrabutylammonium bromide (TBAB), quaternary ammonium salt modified amberlyst (D296), $Bu_4NBr$, and metal-organic frameworks (MOFs).

3. The method of claim 2, wherein the starting material is a difunctional epoxy.

4. The method of claim 2, wherein the starting material is selected from bisphenol A diglycidyl ether (DGEBA), ethylene glycol diglycidyl ether (EGDE), and glycol diglycidyl ether (GDE).

5. The method of claim 1, wherein the diamine is a fatty acid diamine.

6. The method of claim 1, wherein the diamine is selected from diethyl enetriamine, triethylenetetramine, tetraethylenepentamine, pentaethylenehexamine, propylenediamine, dipropylenetriamine, 2,4,4-trimethylhexamethylenediamine, 3,3'-diamino-N-methyldipropylamine, 1,4-bis-(3'-aminopropyl)-piperazine, N,N-bis-(3-aminopropyl)-ethylenediamine, neopentanediamine, 2-methyl-1,5-pentanediamine, 1,3-diaminopentane, and hexamethylenediamine.

7. The method of claim 1, wherein the cyclic carbonate, the internal emulsifier, and the diamine are dissolved in a solvent during the step of combining, wherein the solvent is a water soluble solvent including one or more of ethanol, methanol, and methyl ethyl ketone (MEK), further comprising a step of removing the solvent in connection with the dispersing the neutralized NIPU polymer in the water.

8. The method of claim 1, wherein the epoxy resin includes an epoxy with functionality of 2-4.

9. The method of claim 1, wherein the epoxy resin is selected from bisphenol A diglycidyl ether (DGEBA), trimethylolpropane triglycidyl ether (TTE), and 4,4'-methylenebis (N,N-diglycidylaniline) (MBDA).

10. The method of claim 1, wherein the waterborne NIPU liquid dispersion has a solid content of from about 10 wt. % to about 40 wt. %.

11. The method of claim 1, further comprising a step of allowing the waterborne NIPU liquid dispersion to dry by allowing evaporation of the water therefrom, to thereby form a waterborne NIPU coating film including the neutralized NIPU polymer.

12. The method of claim 11, wherein, prior to the evaporation, a wet waterborne NIPU coating has a wet film thickness of from about 25 μm to about 500 μm.

13. The method of claim 11, wherein the waterborne NIPU coating has a dry film thickness of from about 5 μm to about 300 μm.

14. The waterborne NIPU coating made by the method of claim 11.

15. The waterborne NIPU liquid dispersion made by the method of claim 1.

16. The method of claim 7, further comprising, after the dissolving the cyclic carbonate, the internal emulsifier, and the diamine in the solvent as a mixture and prior to the subjecting the NIPU prepolymer to chain extension, heating the mixture to a temperature of from about 60° C. to about 80° C. for about 6 hours to about 12 hours.

17. The method of claim 1, further comprising applying the waterborne NIPU liquid dispersion onto a substrate to form a wet film, and allowing the water of the wet film to evaporate to thereby form a waterborne NIPU coating film including the neutralized NIPU polymer.

* * * * *